Patented July 9, 1940

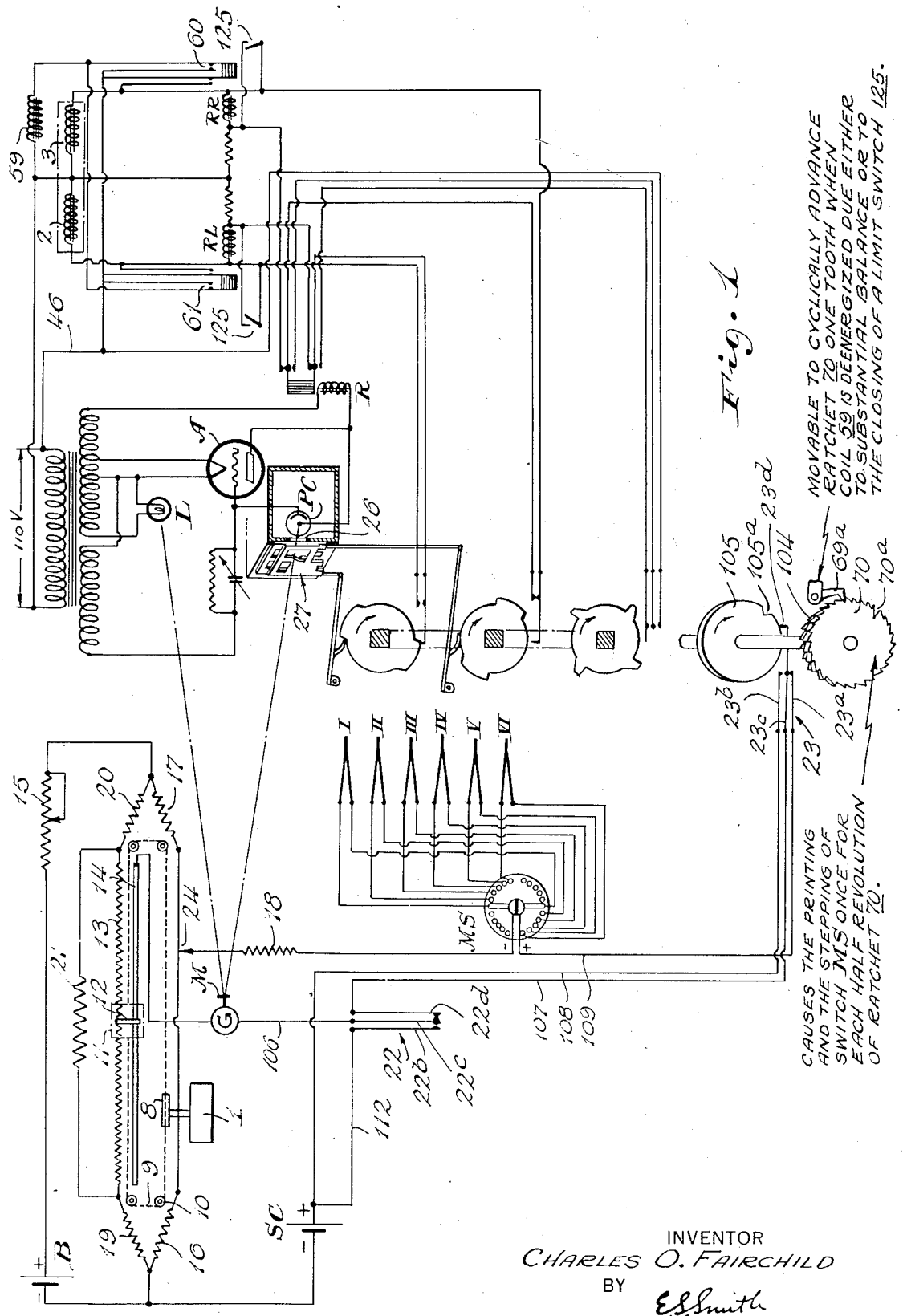

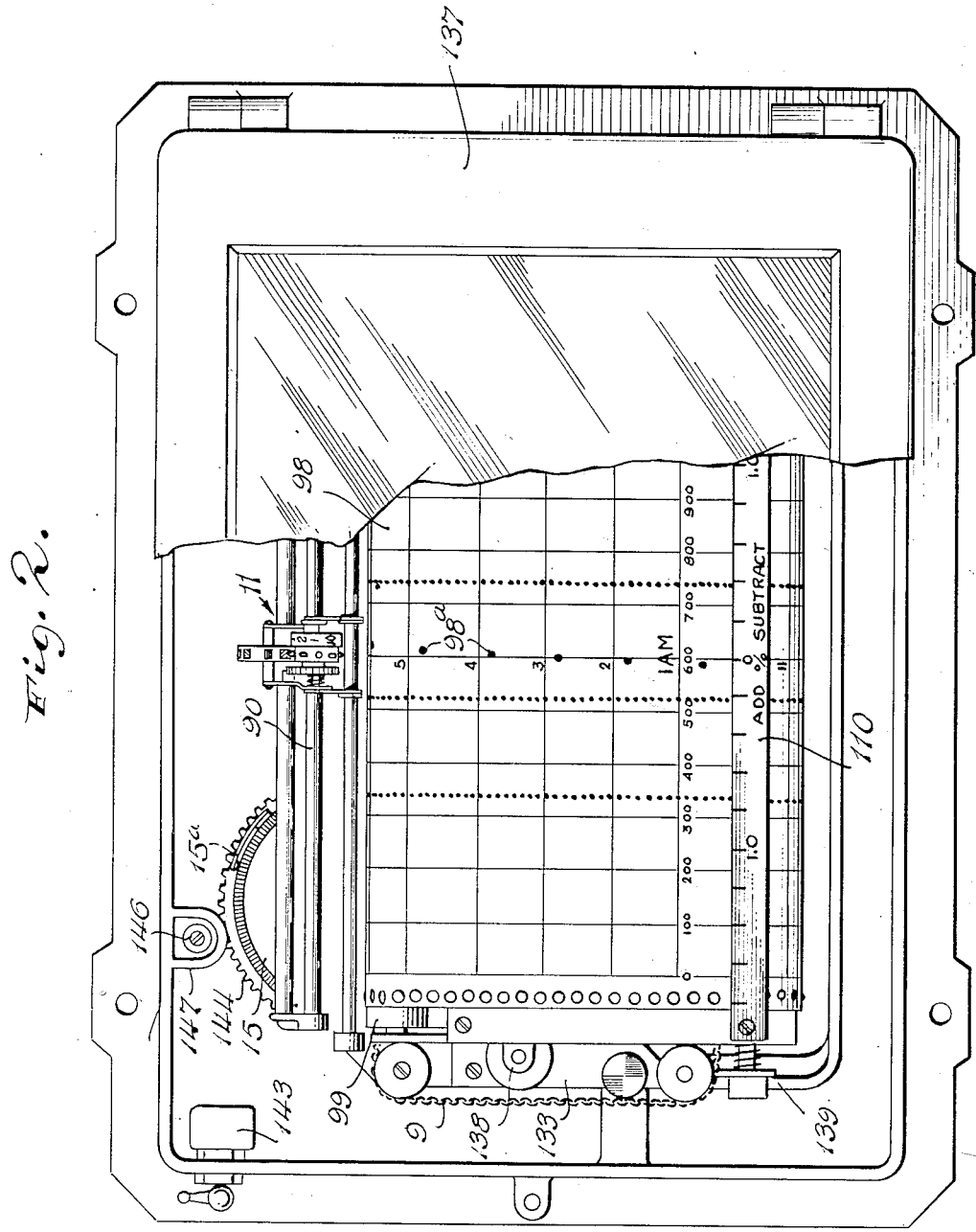

2,207,344

UNITED STATES PATENT OFFICE 2,207,344

RECORDING POTENTIOMETER

Charles O. Fairchild, St. Albans, N. Y., assignor to Charles J. Tagliabue Mfg. Co., Brooklyn, N. Y., a corporation of New York Original application December 31, 1935, Serial No. 56,880. Divided and this application May 11, 1939, Serial No. 273,118

8 Claims. (Cl. 234—1.5)

The present invention relates to measuring and recording instruments, particularly to devices of this kind employing a beam of radiant energy and an element sensitive thereto which are movable with respect to each other upon changes in a condition which is being recorded, and is an improvement on the mechanism disclosed in my United States Patent No. 1,970,559 dated August 21, 1934.

It is one of the objects of the invention to provide a mechanism of the type indicated which is characterized by a high degree of speed, sensitivity and accuracy combined with simplicity, ruggedness and compactness of structure and reliability of operation.

It is a further object of the invention to provide a recording mechanism of the type indicated which is capable of producing a large number of different records.

It is the main object of the invention to provide mechanism for recording variations in the standard current of a recording potentiometer so that suitable correction for any fluctuations in such current can readily be made upon simple inspection of the chart.

This is a division of application Serial No. 56,880, filed Dec. 31, 1935, for Recording potentiometer.

Still other objects of the invention will appear in the following description.

While the invention, or various features thereof, are susceptible of many embodiments and adaptations in measuring, indicating, controlling and other devices, including recording instruments, I shall further describe the same by way of illustration in the form of a multiple-point recording potentiometer for measuring and recording, in succession, a number of variable magnitudes in the form of electrical potentials or capable of being converted into correspondingly varying electrical potentials, such as temperature, pressure, flow, light intensity, conductivity, etc.

On the accompanying drawings,

Fig. 1 is a diagram showing the electrical circuits embodied in a recording potentiometer, together with the associated timing mechanism; and Fig. 2 is a front view of the instrument with the door partly broken away.

According to the embodiment of the invention about to be described, a number of magnitudes to be measured, in the form of electrical currents or voltages or converted into such quantities, are connected in succession with a measuring circuit in the form of a potentiometer, such circuit being then balanced against the quantity to be measured. The relation between the magnitude to be measured and the position of the potentiometer, that is, the condition of unbalance, is converted into deflections of a beam of light whose departure to the left or to the right of a normal or original position, and also the degree of departure, are sensed or detected by means of photosensitive means PC in association with a shutter mechanism 27. Associated with the shutter mechanism and prepared in synchronism with the movements of the latter, is an electrical system which effects movement of a potentiometer contact carriage and thereby brings the measuring circuit into balance.

When substantial balance is reached, the recording and commutating (or switching) mechanism is prepared and after such preparation is completed, the recording mechanism is operated to make a record of the measured magnitude upon a chart. At substantially the same time the commutating mechanism is operated so as to disconnect the source of the measured value and cut in the next value to be measured.

The time between successive recordings is thus not constant but will be equal to the variable time required for the carriage to move from one position of recording to approximately the next position of recording, plus a constant time interval required for the recording and commutating mechanisms to act.

The measuring and balancing circuit

Referring now to Fig. 1, the circuits consist in part of the reversible motor 1 having two windings 2 and 3 adapted to drive it in a clockwise or counterclockwise direction and having a shaft equipped with a toothed wheel and with a pinion engaging a gear on a shaft. The latter carries a sprocket 8 which in turn engages a chain 9 running on four pulleys 10 mounted upon the frame 133. The two ends of the chain are connected to a carriage 11 to move it from the right to left or from left to right, depending on which of the two windings 3 and 2 (Fig. 1) is respectively connected to the source of power.

The carriage 11 is equipped with a sliding contact 12 (see Fig. 1) which cooperates with a slide wire 13 of a potentiometer, and with a return bar 14 leading to the galvanometer G. The potentiometer measuring circuit consists, besides the slide wire 13, of a variable rheostat 15, the source of current B, and the resistors 16 and 17 forming a closed network with the rheostat 15 and battery B, the resistors being connected together and, through a resistor 18, to the multiple switch MS, the other ends being connected also to the other arms 19 and 20 which in turn are connected to the ends of the slide wire 13. The latter is shunted by a calibrating resistor 21. The resistors 20 and 17 are thus connected together and to the rheostat 15; and the resistors 16 and 19 are connected to each other and to the battery B and also to the standard cell SC which can be connected to the galvanometer G through series switches 22 and 23. The galvanometer can also be connected through these two switches to the multiple switch MS and by the latter to any one of, for example, twelve thermocouples, six of which are shown at I to VI (Fig. 1), and through the thermocouples and resistor 18 to an adjustable contact 24 to a lead of appreciable resistance between resistors 16 and 17.

The device functions in such a manner that when the mirror reflects light towards the middle section of the opening (indicating a balanced or predetermined condition in the potentiometer circuit), the motor 1 and therefore carriage 11 remain stationary. While light shines through an outside section (the potentiometer circuit being then unbalanced), motor 1 is started to move the carriage 11 from left to right, and while light shines through an outside section on the opposite side the carriage is moved from right to left. While light shines through intermediate sections the carriage is moved to the right or to the left, respectively, but its motion is periodically interrupted. During the passage of light through the outside sections the motor runs continuously. The rotation of motor 1 and the resulting motion of carriage 11 operate automatically to balance the E. M. F. of one of the thermocouples with the potential difference and during the balancing the deflected galvanometer G is returned to a zero or "normal" position corresponding to its position on open circuit. Soon following such an automatic balancing operation, a record corresponding to the E. M. F. of this thermocouple is made and the multiple switch is then automatically rotated to connect the potentiometer circuit to the next thermocouple in sequence.

As the mirror M approaches the position in which light is reflected in the direction of the central zone (which in the present case indicates that the IR drop in the effective portion of the slide wire equals the E. M. F. of the thermocouple), the rate at which carriage 11 progresses is materially reduced. During this period of step-by-step motion, operations associated with recording and commutating begin. When finally the light beam reaches the central section the amount of light which can pass through opening 26 while the shutters are rising and falling is at no time sufficient to effect closing of relay R. It is not necessary that the central section be large enough to block the entire area of the light beam but only such a fraction of it that relay R will remain open while the shutters operate. Thus neither of the relay coils RL and RR can be energized after the last short step which resulted in swinging the light beam out of adjacent areas into the central area.

If during any cycle of cam operations the light beam swings slightly off of the central section, resulting in sufficient current through relay R to close it, a short step will be taken by the carriage which will tend to return the light to the center or normal position.

Obviously the direction in which the carriage moves in response to the action of the shutters, cam contacts and relay R may be reversed by reversing the connections to the galvanometer or exchanging the connections of the relays RL and RR or motor coils 2 and 3.

While the amplifier A is illustrated as being operated by alternating current, it will be evident that a direct-current operated amplifier may be utilized where only direct current is available. In any case as many stages of amplification will be employed as is necessary to effect operation of relay R. The relation between shutter operation and the positioning of carriage 11 is generally as set forth in my aforementioned Patent 1,970,559.

*Recording and commutating mechanism*

In a multiple point recording instrument, after each successive balancing of the measuring circuit against a variable E. M. F. or other magnitude to be measured, it is necessary to record the position of carriage 11 and to turn the commutating switch MS to disconnect such variable and connect in another variable. The apparatus whereby this is accomplished in cooperation with the balancing circuit described hereinabove is designed to perform the operations without unnecessary delay and at the same time reduce the possibility of a record being made while the light beam is momentarily in the central area as the result of anything other than the attainment of truthful balance of the measuring circuit with the variable connected therewith. This apparatus is described in detail in the application of which this is a division.

Referring to Fig. 1, it will be seen that the electromagnetic coil 59 is connected to one of the line conductors and to contact sets 60 and 61 of relays RR and RL, respectively, so that when either one of these relays closes, coil 59 will be energized by connecting one end of it through the relay contact to conductor 46 running to the other line conductor. Thus, while motor 1 and carriage 11 are in continuous motion in either direction, coil 59 is continuously energized, and whenever motor 1 and carriage 11 take a short step in either direction, coil 59 is momentarily energized.

Pawl 69a is normally operable in regular cycles to oscillate to advance ratchet wheel 70 one tooth in each oscillation. Coil 59 has an armature which is continuously biased away from it toward a position in which the motor 1 is braked and pawl 69a may oscillate and which armature is biased into contact with the core of the coil upon the energization of the latter, in which position it stops the oscillations of pawl 69a. Coil 59 is effectively deenergized when the potentiometer is substantially balanced as indicated by the position, relative to photocell PC, of the light beam reflected by mirror M of galvanometer G or when carriage 11 reaches either end of its travel and closes limit switch 125. The region of substantial balance comprises the central zone in which motor 1 is still and the adjacent zones in which motor 1 operates by steps instead of continuously. The resultant operation is that, as long as coil 59 is not energized, ratchet wheel 70 will be cyclically advanced, and that when this coil is energized, the ratchet wheel 70 will stand still.

Each half revolution of ratchet wheel 70 causes commutating switch MS to advance one step, opening one pair and closing another pair of poles of switch MS.

*The printing or recording mechanism*

The recording of the position of the carriage 11 at the balance point is accomplished by a multiple stylus (carried by the carriage) which is brought into engagement with the chart by a depressor rod 90 the actuation of which is governed by ratchet wheel 70. In Fig. 2 the depressor rod is shown in its highest position. The stylus tips are inked in rotation and at the end of the upward stroke of rod 90 the index wheel shows, when viewed from in front of the instrument, the symbol corresponding with the next record to be made by the stylus now pointing directly downward below its shaft and its ink wheel is held in contact with the stylus wheel by a spring.

The ink pads are saturated with a non-drying ink, the pad having preferably inks of different colors, while the paper of the chart is relatively porous, so that the ink is quickly absorbed and danger of smudging of the record avoided.

The motor operates the carriage.

*Standard current measurement*

Once during each complete revolution of ratchet 70, the double pawl 69a drops into the deep tooth 70a of ratchet 70 and engages ratchet 104 which is smaller than ratchet 70 and is mounted on the same bushing with a cam 105, and a stroke of the arm carrying pawl 69a then rotates ratchet 104 one tooth forward together with cam 105. Cam 105 has one notch 105a and with each complete revolution of this cam the dog 23d on the center leaf 23c of switch 23 drops into notch 105a, causing leaf 23c to make contact with leaf 23b, thus connecting the galvanometer G through conductor 106, switch 22, conductor 107, switch 23, conductor 108 to the standard cell SC. Thus the standard E. M. F. of the cell SC is substituted for a thermocouple E. M. F., the galvanometer G is deflected, unless perchance the carriage 11 is at the balance point, the light beam falls on the photocell, coil 59 is energized, and its armature prevents pawl 69a from oscillating and rotating ratchet 70. Hence the cell SC is connected until carriage 11 travels to the balance point arbitrarily selected on the slide wire 13, whereupon coil 59 is deenergized so that pawl 69a again starts to drive ratchet 70. When ratchet 70 has made one-half revolution, as previously explained this results in a record being printed on the chart. Since, now, the cell SC remains connected and the multiple switch disconnected because switch leaf 23c does not touch leaf 23a but still engages leaf 23b, pawl 69a continues to drive ratchet 70 the second half revolution. The recording mechanism is thus again actuated, and after a second record has been made at the same point, the pawl 69a drops into the deep tooth 70a, engages ratchet 104 and drives cam 105 a step forward, lifting the switch dog 23d out of the notch 105a in cam 105. This causes the switch 23 to disconnect cell SC and to cut in the multiple switch MS through conductor 109, switch 23, conductor 107, switch 22, conductor 106, to the galvanometer G. Thus another thermocouple is connected and the recording of temperatures proceeds until once again the notch in cam 105 reaches the switch dog 23d.

It will be apparent that these recurring connections to the standard cell SC result in a record upon the chart 98 (see Fig. 2) as shown at 98a at relatively long intervals, for example one hour, of the value of the standard current in terms of the slide wire of the potentiometer, because the voltage of the cell SC is balanced with the potential drop in the slide wire from the contact 11 to resistor 19, plus the drop in 19. This record consists of two substantially superimposed dots, of different colors in general offset from the temperature records, and can be interpreted by reading their position with reference to the standard scale 110, Fig. 2, which is graduated in percentage variation from the arbitrary "zero" point which, as illustrated, may be near the middle of the chart, and represents the correct value for the standard current. When the standard current record appears in register with the zero line, the current is correct. If the record is off zero, the temperature records can be corrected according to the percent figures appearing on scale 110. In standardizing the instrument, the current is changed by adjusting the rheostat 15, to such a value that the carriage travels to zero on scale 110 when switch 22 is operated by hand so that leaf 22c touches leaf 22b, connecting the galvanometer G through conductor 106, switch 22, and conductor 112 to the standard cell SC.

In one commercial form of the invention constructed by me the mechanism is so designed that the ratchet 70 makes a complete revolution every 30 seconds, such ratchet having 40 teeth and the ratchet 104 having 60 teeth. The standard current is measured once for every 120 records. The time between records is about 30 seconds, but obviously the instrument can be designed for different speeds of recording and for different numbers of separate records.

*Contact carriage details*

Besides the printing mechanism, the carriage 11 also carries the sliding contact 12, as already mentioned. The contact 12 is pressed against the slide wire 13 and return wire 14 mounted in an insulator plate by springs.

It may sometimes happen that the potentiometer circuit is connected to a variable whose value is outside the range of the chart. In such event the carriage will travel to one or the other limit of its motion and remain thereat with the galvanometer unbalanced, so that the coil 59 remains energized and restrains the oscillation of pawl 69a, thus halting the recording and commutating actions. The simple instrument accordingly would remain in operative until this condition was detected by the attendant and the commutating mechanism would have to be rotated manually to cut in the next variable. Instead, in accordance with the invention, the operation is effected automatically in the following manner:

A portion of carriage 11 at the right and left limits of travel of the carriage 11 engages a switch 125. When the carriage travels to the end of the scale and closes one of these switches, it short-circuits the coil of relay RL or RR, whichever one is closed, corresponding to the motion of the carriage toward the end it has reached. The short-circuiting of the relay coil opens the relay, stops the motor 1, which has been running against a friction drive, and also deenergizes coil 59, permitting the commutating mechanism to turn the multiple switch to the next thermocouple.

*Chart operating mechanism*

The chart timing roll 99 and chart 98 are driven by means of a sprocket chain in well-known manner.

Fig. 2 shows a general front view of the recorder with the windowed door 137 cut away to reveal one end of the entire mechanism, covered for the most part by the chart 98 whose frame 139 is held by thumb screws 138 (only one of which is shown), which engage lugs on the main frame. There are also shown in Fig. 2 a main switch 143, the rheostat 15, with a contact 15a mounted on a gear 144 which is rotated by a pinion on the rear end of a shaft which carries on its forward end a knurled head which reaches through a hole in the door so that the rheostat can be adjusted without opening the instrument. The shaft 146 is mounted in a bracket 147 extending from the top of the casing.

It will be understood that suitable stops are provided to limit the oscillation of the galvanometer mirror so as to prevent the light beam from passing beyond the limits of the opening 26, as the carriage will not be operated under such conditions.

By omitting coil 59, the recording and commutating mechanism can be made independent of the balancing means and can therefore operate at regular intervals. In this way more frequent recording will be obtained. The coil 59 can be readily disconnected and the commutating mechanism MS will switch from one thermocouple to the next, say every 15 seconds. The apparatus will thus have only 15 seconds in which to achieve balance.

From the above it will be seen that I have provided a measuring and recording mechanism wherein the element movable in response to a condition of unbalance is an inertialess beam of light, so that extremely sensitive and accurate measurements can be made, while at the same time the mechanical construction of the instrument is greatly simplified.

It will be obvious that the use of the present invention is not limited to the recording of temperature through the E. M. F. generated by a thermocouple or by means of the change in resistance of a resistance thermometer connected to a Wheatstone bridge, but may be applied to the recording of any variable quantity which can, by any means whatever, be balanced by an operating quantity which in turn must be periodically checked against a standard quantity.

The terms and expressions which I have employed are used as terms of description and not of limitation, and I have no intention, in the use of such terms and expressions of excluding any equivalents of the features shown and described and portions thereof, but recognize that various modifications are possible within the scope of the invention claimed.

I claim:

1. In a recording potentiometer having a graduated chart and a potentiometric circuit, the combination of a source of standard E. M. F., a slide wire in said circuit, a source of nearly-constant standard current in said slide wire, a slidable contact for said slide wire, a galvanometer having two terminals, one of which is connected to said contact, a conductor leading from a fixed point in said circuit corresponding with a fixed point on said slide wire and connectable to an apparatus whose E. M. F. is to be measured, a switch operable periodically to connect the other terminal of the galvanometer selectively to said standard source of E. M. F. and to said apparatus, and means movable with said contact for selectively recording at a position on the chart corresponding with that of said contact the E. M. F. of the apparatus being measured and the value of a function of the standard current depending upon the then position of the switch, the last mentioned value corresponding with the error of the recorded value of the measured E. M. F.

2. An electrical instrument for measuring the value of a variable electrical quantity from a source normally operatively connected to it comprising, in combination, a movable element, a source of a nearly-constant electrical quantity permanently connected in the instrument as an operating standard, means for automatically positioning the movable element in correspondence with the value of said variable electrical quantity, said position being modified by the value of the operating standard, a source of a precisely constant electrical quantity as a reference standard, and mechanism for intermittently selectively operatively connecting the stated sources of variable quantity and the precisely constant quantity with said means to cause said means to periodically position said movable element in correspondence with the then value of the operating standard, whereby the error of the normal measurement is also periodically manifested.

3. An instrument for recording on a chart the value of a measured variable physical quantity from a source normally connected thereto comprising, in combination, a marker movable relative to said chart, a measuring means for automatically positioning said marker in correspondence with the value of such a quantity, a nearly-constant source of such a quantity connected to said measuring means to operate the same to serve as a basis of comparison, a precisely-constant source of one of such quantities as a reference standard, and a mechanism periodically operative to momentarily operatively disconnect the firstnamed source from said measuring means and to connect the lastnamed source to said measuring means during the duration of such disconnection, whereby the chart record shows both the uncorrected values of the measured variable quantity and the then-effective value of that constituting the operating quantity and hence the error of the recorded values of the measured variable quantity.

4. In a potentiometric circuit, the combination of a source of a variable potential to be measured; a galvanometer having two terminals; a slide wire and a sliding contact positionable therealong to balance said galvanometer; an intermittently operable selective switch having a blade movable relative to two contacts; one of said galvanometer terminals being connected to said sliding contact and the other to the blade of said selective switch; a source of standard E. M. F. connected to one contact of the selective switch, the other contact of said selective switch being connected to said source; and a fixed resistor bridging the slide wire and having an intermediate point thereof connectable with said source of variable potential and another point thereof near one end connected with said source of standard E. M. F.

5. In an instrument for recording measured values of a variable physical quantity, from a source thereof connectable with the instrument, by comparing them with a nearly-constant similar quantity as an operating basis, and having a graduated chart having lines corresponding with reference values of said variable quantity, the combination of a scale having a mark thereon corresponding in position with a standard value of the nearly constant quantity at which the instrument correctly records values of the measured quantity and also having graduations corresponding in position with the corrections of such recorded values for departures of the value of the nearly constant quantity from said standard value, said scale mark being alined with one of said chart lines, means for guiding said chart transversely past said scale to maintain said line on the chart in substantial registry with the standard mark on the scale; a source of a precisely-constant quantity as a reference basis the last named quantity being similar to that measured; means for selectively operatively connecting the instrument with said source of the variable physical quantity and with said source of the precisely-constant quantity; a marker movable along the scale and across the chart; and means for automatically positioning said marker relative to said chart and said scale in correspondence respectively with the variable quantity and with the departure of the value of the nearly constant quantity from said standard value when the source of the variable quantity and that of the precisely-constant quantity are respectively connected, whereby the scale shows the error of the recorded measurements on the chart and the chart also carries a record which corresponds in position with the error of the recorded measurements.

6. In an instrument for recording upon a chart the values of a plurality of variable quantities being measured and a value for correcting the measurements in accordance with the departure of said value from a standard value determined from comparison with a reference quantity, the combination of a meter, a marking device having a plurality of markers and positionable by the meter across the chart in correspondence with the value of the metered quantity, a multiple switch having a portion connected to said meter and steppably movable in substantial synchronism with said marking device to sequentially connect any of the sources of the variable quantities with said meter, actuating means for said marking device and said switch for cyclically causing the printing operation of the marking device and the stepping of both said device and said multiple switch, a selective switch alternately connecting the meter with the multiple switch and with a source of said reference quantity, and a cam for actuating said selective switch and intermittently operative by said actuating means in longer cycles than a complete cycle of the metered quantities to operatively connect the meter with said source of the reference quantity during a repeated marking and stepping operation of the marker device, whereby the record made when the source of the reference quantity is connected is readily distinguishable from those for the variable quantities.

7. The instrument set forth in claim 3 in which the marker is constructed to make a definite number of distinguishable but like marks each for a corresponding quantity and in which said mechanism includes an actuating element therefor moving in regular cycles and a means operatively connecting the marker with said element to cause the marker to selectively record the uncorrected value of the measured quantity and the then-effective value of the quantity from said nearly constant source by making one sort of mark for the uncorrected value of the measured quantity recorded during each duration of the stated connection of the source thereof with the instrument and acting differently to make another sort of mark for the error of such measurements during each duration of the stated disconnection of said source from the instrument as indicated by the then-effective value of the variable constituting the operating basis of comparison.

8. In a self-balancing potentiometric circuit connectable to a source of variable E. M. F. and including a slide wire and a contact slidable between operating limits along said slide wire, a galvanometer, and means governed by the galvanometer to position the slidable contact to automatically balance the galvanometer, the combination with the slide wire, the slidable contact and the galvanometer of: a fixed resistor connected in series with said slide wire, a source of current I to produce an IR drop in said fixed resistor and slide wire due to their resistance R, a two-way switch having two contacts and a blade movable therebetween, said blade being connected to one terminal of the galvanometer, the other terminal of said galvanometer being connected to said slidable contact, and a source of standard E. M. F. connected to one of the switch contacts and to the end of the fixed resistor away from the slide wire, the source of variable E. M. F. being connectable to the other of said switch contacts and to a point in the circuit having substantially the same potential as a point between a point on the fixed resistor away from the outside end of the fixed resistor and a point on the slide wire near the operating limit adjacent the junction of said fixed resistor and said slide wire; the position of the slidable contact for a balanced condition of the galvanometer corresponding with the value of said current I when the source of standard E. M. F. is connected and said balanced position substantially measuring the value of the variable E. M. F. when the source thereof is connected whereby, when the source of standard E. M. F. is connected, a departure of the position of the slidable contact from that for the current producing correct measurements of the value of the variable E. M. F. corresponds with the error of the measured value of the variable E. M. F.

CHARLES O. FAIRCHILD.